United States Patent
Kawamura

(10) Patent No.: US 12,309,854 B2
(45) Date of Patent: May 20, 2025

(54) INFORMATION PROCESSING SYSTEM, APPARATUS, AND NON-TRANSITORY COMPUTER READABLE MEDIUM STORING PROGRAM FOR MANAGING AND USING CONNECTION RECORD LIST FOR CONNECTION

(71) Applicant: FUJIFILM Business Innovation Corp., Tokyo (JP)

(72) Inventor: Satoshi Kawamura, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 503 days.

(21) Appl. No.: 17/711,368

(22) Filed: Apr. 1, 2022

(65) Prior Publication Data

US 2023/0090847 A1    Mar. 23, 2023

(30) Foreign Application Priority Data

Sep. 22, 2021  (JP) ................................. 2021-153982

(51) Int. Cl.
*H04W 76/10* (2018.01)
*H04W 4/80* (2018.01)
*H04W 12/06* (2021.01)

(52) U.S. Cl.
CPC ............. *H04W 76/10* (2018.02); *H04W 4/80* (2018.02); *H04W 12/06* (2013.01)

(58) Field of Classification Search
None
See application file for complete search history.

(56) References Cited

U.S. PATENT DOCUMENTS

| | | | |
|---|---|---|---|
| 2019/0182668 A1* | 6/2019 | Yasukawa | H04L 63/083 |
| 2021/0083957 A1* | 3/2021 | Takemura | H04L 43/0876 |
| 2021/0243603 A1* | 8/2021 | Yin | H04L 9/0861 |
| 2021/0307087 A1* | 9/2021 | Sato | H04W 76/10 |

FOREIGN PATENT DOCUMENTS

JP    2004-328153 A    11/2004

* cited by examiner

*Primary Examiner* — Diane L Lo
(74) *Attorney, Agent, or Firm* — Oliff PLC

(57) ABSTRACT

An information processing system includes plural mobile terminals and an information processing apparatus including an apparatus-side processor, in which each of the mobile terminals is configured to establish communicative connection to the information processing apparatus via any one of plural wireless access points. The apparatus-side processor is configured to: accumulate, in a memory, pieces of identification information of the wireless access points via which the mobile terminals established communicative connection to the information processing apparatus to generate a connection record list of the wireless access points via which the mobile terminals established communicative connection to the information processing apparatus in a past; and report the connection record list to a user who intends to establish communicative connection to the information processing apparatus via any one of the wireless access points by using the mobile terminal of the user.

19 Claims, 13 Drawing Sheets

| IDENTIFICATION INFORMATION (SSID) |
| AUTHENTICATION INFORMATION (CRYPTOGRAPHY, PASSWORD) |
| SUCCESSFUL CONNECTION COUNT |
| FAILED CONNECTION COUNT |
| LAST CONNECTION DATE |
| ... |

| | | | | |
|---|---|---|---|---|
| NIC30a | CONNECTION INFORMATION OF WIRELESS AP 14a | CONNECTION INFORMATION OF WIRELESS AP 14d | CONNECTION INFORMATION OF WIRELESS AP 14e | ... |
| NIC30b | CONNECTION INFORMATION OF WIRELESS AP 14b | CONNECTION INFORMATION OF WIRELESS AP 14f | CONNECTION INFORMATION OF WIRELESS AP 14g | ... |
| NIC30c | CONNECTION INFORMATION OF WIRELESS AP 14c | ... | ... | ... |
| ... | ... | ... | ... | ... |

| | PRINTING FROM MOBILE TERMINAL | SCAN DATA TRANSFER TO MOBILE TERMINAL | SCAN DATA TRANSFER BY MAIL | SCAN DATA TRANSFER BY FAX | ... |
|---|---|---|---|---|---|
| NIC30a | ✓ | ✓ | ✓ | ✓ | ... |
| NIC30b | ✓ | ✓ | — | ✓ | ... |
| NIC30c | ✓ | — | — | — | ... |
| ... | ... | ... | ... | ... | ... |

FIG. 14

| IDENTIFICATION INFORMATION (SSID) |
| AUTHENTICATION INFORMATION (CRYPTOGRAPHY, PASSWORD) |
| SUCCESSFUL CONNECTION COUNT |
| FAILED CONNECTION COUNT |
| DATE OF AP REGISTRATION UPDATE |
| ATTRIBUTE INFORMATION |
| ... |

INFORMATION PROCESSING SYSTEM, APPARATUS, AND NON-TRANSITORY COMPUTER READABLE MEDIUM STORING PROGRAM FOR MANAGING AND USING CONNECTION RECORD LIST FOR CONNECTION

CROSS-REFERENCE TO RELATED APPLICATIONS

This application is based on and claims priority under 35 USC 119 from Japanese Patent Application No. 2021-153982 filed Sep. 22, 2021.

BACKGROUND

(i) Technical Field

The present disclosure relates to an information processing system, an information processing apparatus, and a non-transitory computer readable medium storing a program.

(ii) Related Art

Japanese Unexamined Patent Application Publication No. 2004-328153 discloses a wireless communication apparatus that performs wireless communication with a wireless access point. The wireless communication apparatus acquires history information (e.g., connection process period, communication period, transfer rate, and type of corresponding service) related to each of a plurality of connectable wireless access points, selects a wireless access point appropriate to a predetermined service from among the plurality of wireless access points based on the acquired history information, and performs wireless communication with the selected wireless access point.

SUMMARY

Aspects of non-limiting embodiments of the present disclosure relate to the following circumstances. In some systems, communicative connection may be established from a mobile terminal to an information processing apparatus via wireless access point. Through the communicative connection from the mobile terminal to the information processing apparatus via the wireless access point, for example, the mobile terminal may transmit a processing request to the information processing apparatus to cause the information processing apparatus to execute a process based on the processing request. Alternatively, the mobile terminal may receive data related to the processing request from the information processing apparatus via the wireless access point.

Such systems may include a plurality of wireless access points communicatively connectable from the mobile terminal. Those wireless access points may include a wireless access point that may lead to failure in communicative connection from the mobile terminal to the information processing apparatus when the mobile terminal establishes communicative connection to this wireless access point.

In such systems, each user needs to select an appropriate wireless access point that may establish communicative connection from the mobile terminal to the information processing apparatus from among the plurality of wireless access points. The user may search for the appropriate wireless access point by himself or herself, but may require time and effort.

To establish communicative connection from the mobile terminal to the information processing apparatus via any one of the plurality of wireless access points, it is appropriate that the user may grasp the appropriate wireless access point more easily than in the case where the user searches for the wireless access point by himself or herself.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing system including: a plurality of mobile terminals; and an information processing apparatus comprising an apparatus-side processor, wherein each of the mobile terminals is configured to establish communicative connection to the information processing apparatus via any one of a plurality of wireless access points, wherein the apparatus-side processor is configured to: accumulate, in a memory, pieces of identification information of the wireless access points via which the mobile terminals established communicative connection to the information processing apparatus to generate a connection record list of the wireless access points via which the mobile terminals established communicative connection to the information processing apparatus in a past; and report the connection record list to a user who intends to establish communicative connection to the information processing apparatus via any one of the wireless access points by using the mobile terminal of the user.

BRIEF DESCRIPTION OF THE DRAWINGS

Exemplary embodiments of the present disclosure will be described in detail based on the following figures, wherein:

FIG. 10 illustrates an example of a connection record list in the second exemplary embodiment;

FIG. 11 illustrates an example of contents of executable process information;

FIG. 14 illustrates an example of contents of connection information of a wireless access point in the third exemplary embodiment.

DETAILED DESCRIPTION

First Exemplary Embodiment

Figure 1:
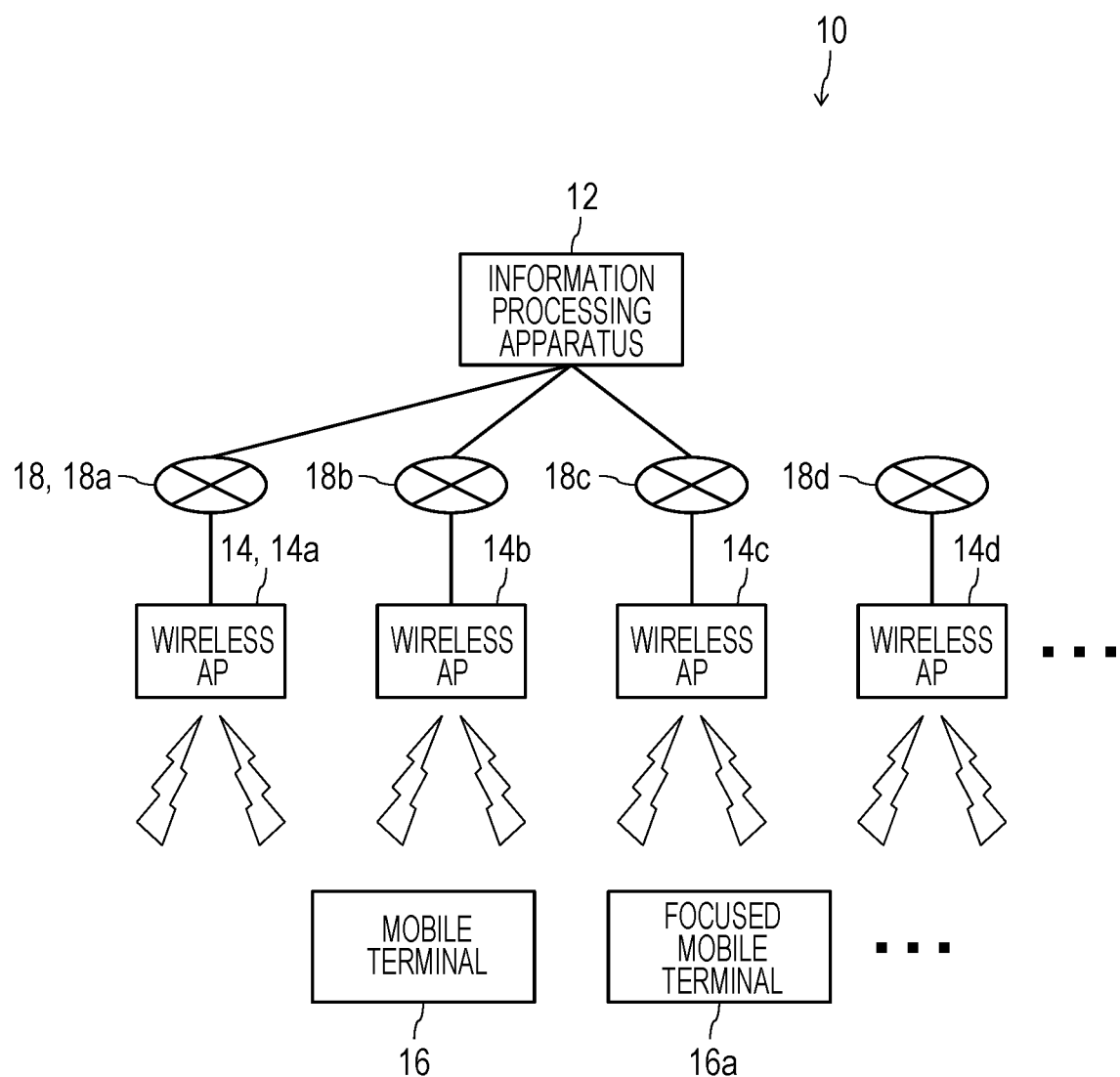
FIG. 1 is a schematic configuration diagram of an information processing system according to a first exemplary embodiment.

FIG. 1 is a schematic configuration diagram of an information processing system 10 according to a first exemplary embodiment. The information processing system 10 includes an information processing apparatus 12, a plurality of wireless access points 14 (hereinafter referred to as "wireless APs 14"), and a plurality of mobile terminals 16 to be used by a plurality of users. In FIG. 1, a focused mobile terminal 16a is one of the mobile terminals 16 and is described later.

The information processing apparatus 12 and each wireless AP 14 are communicatively connected to each other via a communication network 18 including a local area network (LAN). The network 18 may be a wired LAN to perform Ethernet (registered trademark) communication or a wireless LAN using a wireless router to perform wireless communication. Each wireless AP 14 and each mobile terminal 16 are communicatively connectable by wireless communication via a wireless LAN or a cellular communication network. Thus, each mobile terminal 16 may establish communicative connection to the information processing apparatus 12 via any one of the plurality of wireless APs 14.

In this exemplary embodiment, the wireless APs 14 are communicably connected to the information processing apparatus 12 via different networks 18 as illustrated in FIG. 1, the information processing apparatus 12 is connected to networks 18a, 18b, and 18c. A wireless AP 14a is connected to the network 18a. A wireless AP 14b is connected to the network 18b. A wireless AP 14c is connected to the network 18c. Thus, each mobile terminal 16 is communicatively connectable to the information processing apparatus 12 via the wireless AP 14a and the network 18a, via the wireless AP 14b and the network 18b, or via the wireless AP 14c and the network 18c. Each wireless AP 14 and each network 18 need not connected in a one-to-one relationship, and a plurality of wireless APs 14 may be connected to one of the plurality of networks 18 connected to the information processing apparatus 12.

The plurality of wireless APs 14 include a wireless AP 14 connected to a network 18 that is not connected to the information processing apparatus 12. In the example of FIG. 1, a wireless AP 14d is connected to a network 18d, and the information processing apparatus 12 is not connected to the network 18d. Even if each mobile terminal 16 is wirelessly connected to the wireless AP 14d, the mobile terminal 16 is not communicatively connectable to the information processing apparatus 12. To establish communicative connection from the mobile terminal 16 to the information processing apparatus 12, the mobile terminal 16 needs to establish communicative connection to a wireless AP 14 connected to a network 18 that is connected to the information processing apparatus 12 among the plurality of wireless APs 14 (i.e., a wireless AP 14 communicatively connectable to the information processing apparatus 12). The information processing system 10 assists the user in establishing communicative connection from the mobile terminal 16 to the information processing apparatus 12 via an appropriate wireless AP 14.

In this exemplary embodiment, the information processing system 10 is installed in an office, and the information processing apparatus 12 is an image forming apparatus that executes a printing process by receiving a print job as a processing request from a user. The image forming apparatus may receive the print job from the user via the network 18. The office includes the plurality of wireless APs 14 connected to various networks 18. The wireless APs 14 include a wireless AP 14 that is not communicatively connectable to the information processing apparatus 12. For example, a user newly assigned to the office (e.g., a new employee or a shifted employee) may be confused about the wireless AP 14 to which his/her mobile terminal 16 is connectable to send a print job to the information processing apparatus 12. The information processing system 10 assists such a user. The application of the information processing system 10 is not limited to this case.

Figure 2:
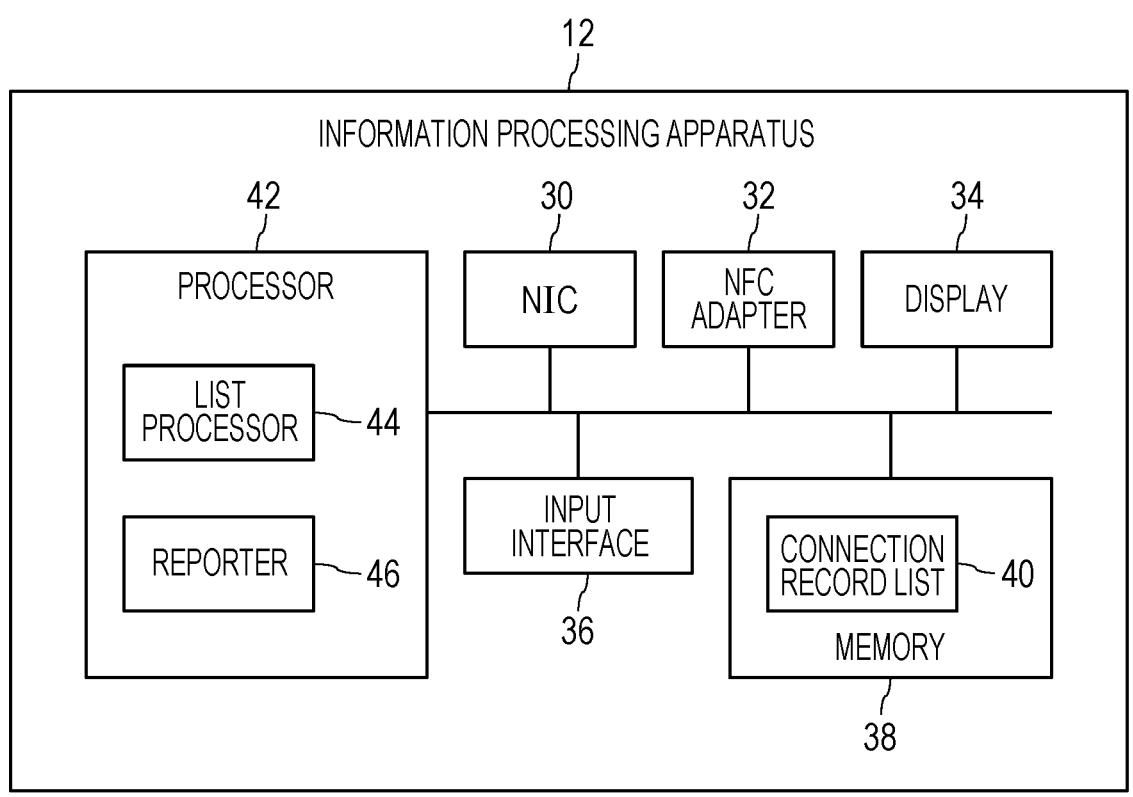
FIG. 2 is a schematic configuration diagram of an information processing apparatus according to the first exemplary embodiment.

FIG. 2 is a schematic configuration diagram of the information processing apparatus 12. As described above, the information processing apparatus 12 in this exemplary embodiment is the image forming apparatus that executes the printing process based on the print job from the user. The information processing apparatus 12 is not limited thereto, and may be any apparatus as long as the apparatus is communicatively connectable to the user's mobile terminal 16 via the wireless AP 14.

A network interface card (NIC) 30 serving as a communication interface is a communication adapter for connection to the network 18 such as a LAN. The NIC 30 is communicably connected to the wireless AP 14 via the network 18 to exert a function of establishing communicative connection to the mobile terminal 16 via the wireless AP 14.

A near field communication (NFC) adapter 32 is a communication adapter for short-range wireless communication with other apparatuses (in particular, the mobile terminals 16) near the information processing apparatus 12. The short-range wireless communication herein refers to so-called NFC in a narrow sense. That is, the short-range wireless communication herein includes an NFC technology such as Bluetooth (registered trademark), ZigBee (registered trademark), or Felica (registered trademark), but does not include a wireless LAN.

The short-range wireless communication has a lower communication speed than LAN communication or mobile communication using a cellular network. Thus, the short-range wireless communication is not suitable to large-capacity data transmission. To transmit large-capacity data by wireless communication, the wireless LAN or the mobile communication is used. For example, the large-capacity print job is sent to the information processing apparatus 12 by the wireless LAN or the mobile communication instead of the short-range wireless communication.

For example, a display 34 includes a liquid crystal panel. The display 34 displays a screen including various types of information.

For example, an input interface 36 includes a touch panel or buttons. The input interface 36 receives instructions from the users.

For example, a memory 38 includes a hard disk drive (HDD), a solid state drive (SSD), an embedded multimedia card (eMMC), a read only memory (ROM), or a random access memory (RAM). The memory 38 stores an information processing program for operating individual parts of the information processing apparatus 12. As illustrated in FIG. 2, the memory 38 stores a connection record list 40. The connection record list 40 is a list of wireless APs 14 via which each mobile terminal 16 established communicative connection to the information processing apparatus 12 (specifically, the NIC 30) in the past. The connection record list 40 is created or edited by a list processor 44 described later. Details of the connection record list 40 are described together with details of processes to be executed by the list processor 44.

A processor 42 serving as an apparatus-side processor refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device). The processor 42 is broad enough to encompass one processor or plural processors in collaboration which are located physically apart from each other but may work cooperatively. As illustrated in FIG. 2, the processor 42 functions as the list processor 44 and a reporter 46 based on the information processing program stored in the memory 38.

The list processor 44 creates and edits the connection record list 40. Specifically, when the mobile terminal 16 establishes communicative connection to the information processing apparatus 12 via any one of the plurality of wireless APs 14, the list processor 44 accumulates, in the memory 38, identification information of the wireless AP 14 via which the mobile terminal 16 establishes connection. The accumulated information serves as the connection record list 40.

Figures 3, 4:
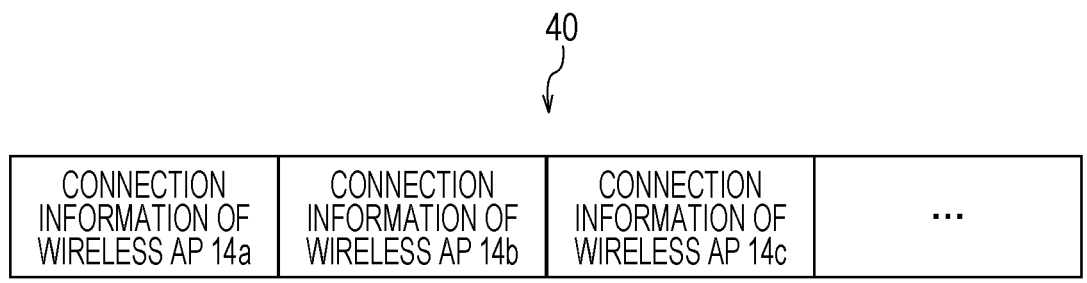
FIG. 3 illustrates an example of a connection record list in the first exemplary embodiment.
FIG. 4 illustrates an example of contents of connection information of a wireless access point in the first exemplary embodiment.

FIG. 3 illustrates an example of the connection record list 40 in the first exemplary embodiment. For example, when the mobile terminal 16 establishes communicative connection to the information processing apparatus 12 via the wireless AP 14a, the list processor 44 registers connection information of the wireless AP 14a in the connection record list 40. As described later with reference to FIG. 4, the connection information of the wireless AP 14 includes identification information of the wireless AP 14. When the mobile terminal 16 establishes communicative connection to the information processing apparatus 12 via the wireless AP 14b, the list processor 44 registers connection information of the wireless AP 14b in the connection record list 40. When the mobile terminal 16 establishes communicative connection to the information processing apparatus 12 via the wireless AP 14c, the list processor 44 registers connection information of the wireless AP 14c in the connection record list 40. Since the mobile terminal 16 is not able to establish communicative connection to the information processing apparatus 12 via the wireless AP 14d, connection information of the wireless AP 14d is not registered in the connection record list 40.

Thus, the connection record list 40 includes the wireless APs 14 via which the mobile terminal 16 successfully established communicative connection to the information processing apparatus 12. In other words, the connection record list 40 is a list of the wireless APs 14 via which the communicative connection to the information processing apparatus 12 was successfully established.

FIG. 4 illustrates an example of contents of the connection information of the wireless AP 14 in the first exemplary embodiment. As described above, the connection information of the wireless AP 14 includes the identification information of the wireless AP 14. In this exemplary embodiment, the connection information of the wireless AP 14 includes a service set identifier (SSID) of the wireless AP 14 as the identification information of the wireless AP 14. The SSID of the wireless AP 14 via which the mobile terminal 16 established communicative connection to the information processing apparatus 12 may be acquired from the mobile terminal 16 by communication with the mobile terminal 16 (communication using the NIC 30 or short-range wireless communication using the NFC adapter 32). Alternatively, the list processor 44 may acquire the SSID by executing a command (e.g., tracert command) to display a list of network routes to the mobile terminal 16 while the mobile terminal 16 is communicatively connected to the information processing apparatus 12 via the wireless AP 14.

The connection information of the wireless AP 14 includes, in addition to the SSID serving as the identification information, authentication information for use in communicative connection to the wireless AP 14 from the mobile terminal 16, a successful connection count that is the number of times the mobile terminal 16 established communicative connection to the information processing apparatus 12 via the wireless AP 14, a failed connection count that is the number of times the mobile terminal 16 attempted to establish communicative connection to the information processing apparatus 12 via the wireless AP 14 but failed to establish the communicative connection, and the last connection date showing a time when the mobile terminal 16 established communicative connection to the information processing apparatus 12 via the wireless AP 14 last time.

Examples of the authentication information include cryptography or a password of the wireless AP 14. The authentication information is registered in the connection record list 40 by the list processor 44. Specifically, when the mobile terminal 16 has established communicative connection to the information processing apparatus 12 via the wireless AP 14, the mobile terminal 16 transmits the SSID and the authentication information of the wireless AP 14 to the information processing apparatus 12 by communication using the NIC 30 or short-range wireless communication using the NFC adapter 32. The list processor 44 registers the received SSID and the received authentication information in association with each other in the connection record list 40 as the connection information of the wireless AP 14.

The successful connection count is measured by the list processor 44. Specifically, when the mobile terminal 16 establishes communicative connection to the information processing apparatus 12 via the wireless AP 14 and the SSID of the wireless AP 14 is acquired, the list processor 44 determines whether the SSID has already been registered in the connection record list 40. If the SSID has already been registered, the list processor 44 increments the successful connection count in the connection information of the wireless AP 14 including the SSID. If the SSID is not registered in the connection record list 40, the list processor 44 newly registers, in the connection record list 40, connection information of the wireless AP 14 including the SSID and a successful connection count of "1". Since the successful connection count is included in the connection information of each wireless AP 14, the list processor 44 compiles the successful connection counts for the individual wireless APs 14.

The failed connection count is also measured by the list processor 44. Specifically, when the mobile terminal 16 attempts to establish communicative connection to the information processing apparatus 12 via the wireless AP 14 but fails to establish the communicative connection, the mobile terminal 16 transmits the SSID of the wireless AP 14 to the information processing apparatus 12 by short-range wireless communication. The list processor 44 determines whether the SSID has already been registered in the connection record list 40. If the SSID has already been registered, the list processor 44 increments the failed connection count in the connection information of the wireless AP 14 including the SSID. If the SSID is not registered in the connection record list 40, the list processor 44 takes no particular action in this exemplary embodiment. Since the failed connection count is also included in the connection information of each wireless AP 14, the list processor 44 compiles the failed connection counts for the individual wireless APs 14.

The state in which the SSID has already been registered in the connection record list 40 means that the mobile terminal 16 successfully established communicative connection to the information processing apparatus 12 via the wireless AP 14 in the past. However, the communication via the wireless AP 14 may become unstable or the mobile terminal 16 may fail to establish communicative connection to the information processing apparatus 12 via the wireless AP 14 depending on, for example, the radio field intensity of radio waves generated by the wireless AP 14, influence of interference with radio waves from other surrounding wireless devices, or a change in the configuration of the network 18 between the information processing apparatus 12 and the wireless AP 14. Thus, even if the mobile terminal 16 established connection via the wireless AP 14 registered in the connection record list 40, the mobile terminal 16 may fail to establish communicative connection to the information processing apparatus 12.

A large failed connection count means that the communicative connection from the mobile terminal 16 to the information processing apparatus 12 via the wireless AP 14 is unstable. It is inappropriate that such a wireless AP 14 be included in the connection record list 40 that is the list of the wireless APs 14 via which the communicative connection to the information processing apparatus 12 was established successfully. Thus, the list processor 44 may delete, from the connection record list 40, the connection information of the wireless AP 14 whose failed connection count has reached a predetermined threshold count. For example, the threshold count is set as appropriate by a manager of the information processing apparatus 12.

When the connection information of the wireless AP 14 whose failed connection count has reached the threshold count or more is deleted from the connection record list 40, the connection record list 40 is indistinguishable as to whether the communicative connection from the mobile terminal 16 to the information processing apparatus 12 was established via the wireless AP 14 in the past but the failure count of the communicative connection has reached the threshold count or more, or the communicative connection from the mobile terminal 16 to the information processing apparatus 12 has never been established via the wireless AP 14. Thus, the list processor 44 may keep, in the connection record list 40, the wireless AP 14 whose failed connection count has reached the threshold count or more.

The last connection date is also set by the list processor 44. Specifically, when the mobile terminal 16 establishes communicative connection to the information processing apparatus 12 via the wireless AP 14 and the SSID of the wireless AP 14 is acquired, the list processor 44 acquires a current time by using a timer function of the information processing apparatus 12, and updates the last connection date in the connection information of the wireless AP 14 including the SSID to the current time.

If there is a wireless AP 14 that is not used for the communicative connection between the mobile terminal 16 and the information processing apparatus 12 for a long period, the wireless AP 14 may be removed from the information processing system 10. Thus, the list processor 44 may delete, from the connection record list 40, the connection information of the wireless AP 14 that is not used for the communicative connection between the mobile terminal 16 and the information processing apparatus 12 for a predetermined period based on a difference between the last connection date and the current time. For example, the predetermined period is set as appropriate by the manager of the information processing apparatus 12.

Referring back to FIG. 2, the reporter 46 reports the connection record list 40 to a user who intends to establish communicative connection to the information processing apparatus 12 via the wireless AP 14 by using the mobile terminal 16. The mobile terminal 16 that is used by the user who intends to establish communicative connection to the information processing apparatus 12 via the wireless AP 14 is herein referred to as "focused mobile terminal 16a".

Various methods may be conceivable as a method for reporting the connection record list 40 to such a user. For example, the connection record list 40 may be transmitted to the focused mobile terminal 16a by short-range wireless communication and displayed on a display of the focused mobile terminal 16a. For example, if the information processing apparatus 12 is an image forming apparatus, the user may transmit his/her user information from the focused mobile terminal 16a by short-range wireless communication between the focused mobile terminal 16a and the information processing apparatus 12 prior to transmission of a print job to the information processing apparatus 12, and the information processing apparatus 12 may authenticate the user based on the user information. At this time, the reporter 46 may transmit the connection record list 40 to the focused mobile terminal 16a.

If the user may be present near the information processing apparatus 12, the reporter 46 may report the connection record list 40 to the user by displaying the connection record list 40 on the display 34.

As described above, the connection information of each wireless AP 14 in the connection record list 40 includes the authentication information, the successful connection count, and the failed connection count in addition to the SSID of the wireless AP 14. By reporting the connection record list 40 to the user, the reporter 46 also reports the authentication information, the successful connection count, and the failed connection count of each wireless AP 14 in the connection record list 40 to the user.

The reporter 46 may report the connection record list 40 to the user while sorting the wireless APs 14 in descending order of the successful connection counts.

Figure 5:
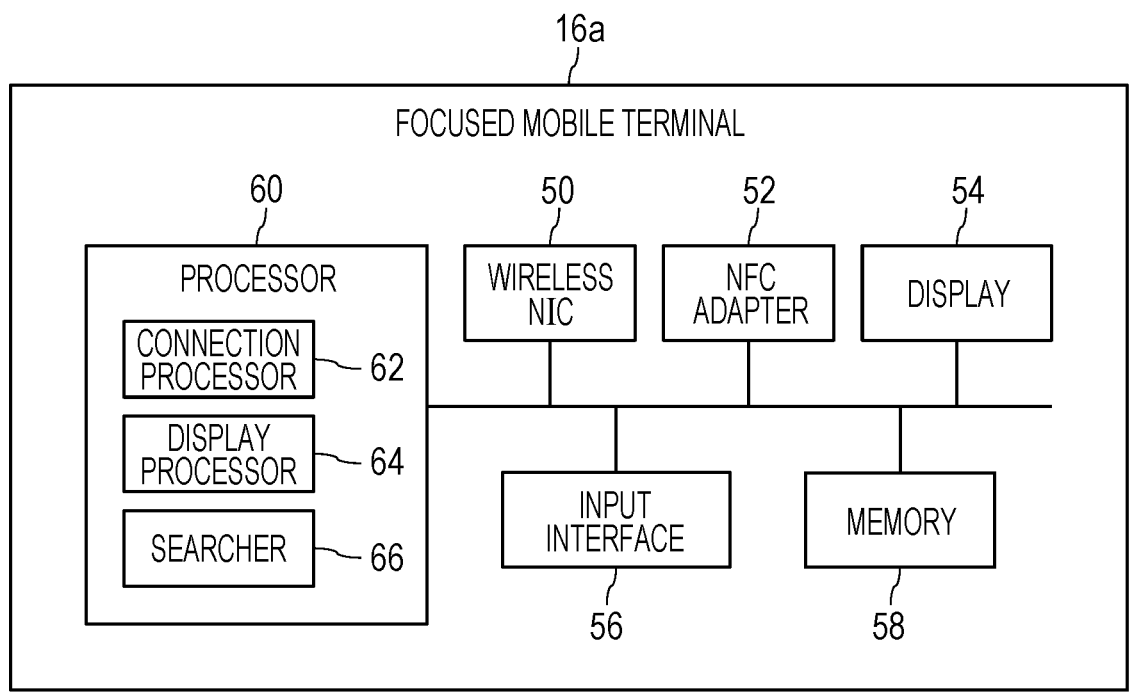
FIG. 5 is a schematic configuration diagram of a focused mobile terminal.

FIG. 5 is a schematic configuration diagram of the focused mobile terminal 16a. Although the focused mobile terminal 16a is described below, the other mobile terminals 16 have substantially the same configurations as that of the focused mobile terminal 16a because the focused mobile terminal 16*a* is one of the mobile terminals 16. Although the focused mobile terminal 16*a* is a smartphone or a tablet terminal, the focused mobile terminal 16*a* may be any terminal as long as the terminal may be carried by the user and exert the following functions.

A wireless NIC 50 is a communication adapter for wireless communication with the wireless AP 14 using the wireless LAN or the mobile communication.

An NFC adapter 52 is a communication adapter for short-range wireless communication with other apparatuses (in particular, the information processing apparatus 12) near the focused mobile terminal 16*a*.

For example, a display 54 includes a liquid crystal panel. The display 54 displays a screen including various types of information such as the connection record list 40 sent from the information processing apparatus 12.

For example, an input interface 56 includes a touch panel or buttons. The input interface 56 receives instructions from the user.

For example, a memory 58 includes an eMMC, a ROM, or a RAM. The memory 58 stores a mobile terminal program for operating individual parts of the focused mobile terminal 16*a*.

A processor 60 serving as a terminal-side processor refers to hardware in a broad sense. Examples of the processor include general processors (e.g., CPU) and dedicated processors (e.g., GPU, ASIC, FPGA, and programmable logic device). The processor 60 is broad enough to encompass one processor or plural processors in collaboration which are located physically apart from each other but may work cooperatively. As illustrated in FIG. 5, the processor 60 functions as a connection processor 62, a display processor 64, and a searcher 66 based on the mobile terminal program stored in the memory 58.

The connection processor 62 executes a process for establishing communicative connection to any one of the plurality of wireless APs 14. Specifically, the connection processor 62 appropriately sets an SSID of a connection target wireless AP 14, cryptography in wireless communication with the wireless AP 14, and a password to establish communicative connection between the focused mobile terminal 16*a* and the wireless AP 14. In this exemplary embodiment, the focused mobile terminal 16*a* is communicatively connected to an appropriately selected wireless AP 14 also before the connection record list 40 is reported to the user.

The display processor 64 receives the connection record list 40 from the information processing apparatus 12 by short-range wireless communication, and displays the connection record list 40 on the display 54. In this manner, the connection record list 40 is reported to the user.

If the connection record list 40 received from the information processing apparatus 12 does not include a wireless AP 14 to which the focused mobile terminal 16*a* is communicatively connected currently (hereinafter referred to as "currently connected wireless AP 14"), the searcher 66 searches for another wireless AP 14 near the focused mobile terminal 16*a*. If the connection record list 40 includes the currently connected wireless AP 14, the searcher 66 does not perform the search and the connection processor 62 keeps the communicative connection to the wireless AP 14. The focused mobile terminal 16*a* establishes communicative connection to the information processing apparatus 12 via the wireless AP 14.

The user may determine whether the connection record list 40 includes the currently connected wireless AP 14. In this case, the user finds an SSID of the currently connected wireless AP 14 by checking, for example, communication setting information of the focused mobile terminal 16*a*, and determines whether the connection record list 40 includes the found SSID. If the connection record list 40 does not include the SSID, the user inputs a search instruction via the input interface 56, and the searcher 66 searches for another wireless AP 14 near the focused mobile terminal 16*a* based on the search instruction. The searcher 66 may automatically determine whether the connection record list 40 includes the currently connected wireless AP 14.

An SSID of another wireless AP 14 near the focused mobile terminal 16*a* is acquired through the search by the searcher 66.

The connection processor 62 determines whether the connection record list 40 includes the SSID acquired by the searcher 66. If the connection record list 40 includes the acquired SSID, the connection processor 62 establishes communicative connection to the wireless AP 14 indicated by the SSID, and establishes communicative connection to the information processing apparatus 12 via the wireless AP 14. If a plurality of wireless APs 14 are found in the connection record list 40 through the search by the searcher 66, the connection processor 62 may inquire of the user which wireless AP 14 is used for establishing communicative connection to the information processing apparatus 12, and establish communicative connection to a wireless AP 14 selected by the user. Alternatively, the connection processor 62 may automatically select a wireless AP 14 having the largest successful connection count from among the plurality of wireless APs 14 found in the connection record list 40, and establish communicative connection to the selected wireless AP 14.

If no wireless AP 14 is found in the connection record list 40 through the search by the searcher 66, the connection processor 62 keeps the communicative connection to the currently connected wireless AP 14, and the focused mobile terminal 16*a* attempts to establish communicative connection to the information processing apparatus 12 via the currently connected wireless AP 14. The fact that the searcher 66 has performed the search means that the connection record list 40 does not include the currently connected wireless AP 14. However, there is a possibility that the communicative connection to the information processing apparatus 12 may be established via the currently connected wireless AP 14. Therefore, the focused mobile terminal 16*a* attempts to establish communicative connection to the information processing apparatus 12 via the currently connected wireless AP 14. If the communicative connection to the information processing apparatus 12 is successfully established via the currently connected wireless AP 14, the wireless AP 14 is newly registered in the connection record list 40.

Figure 6:
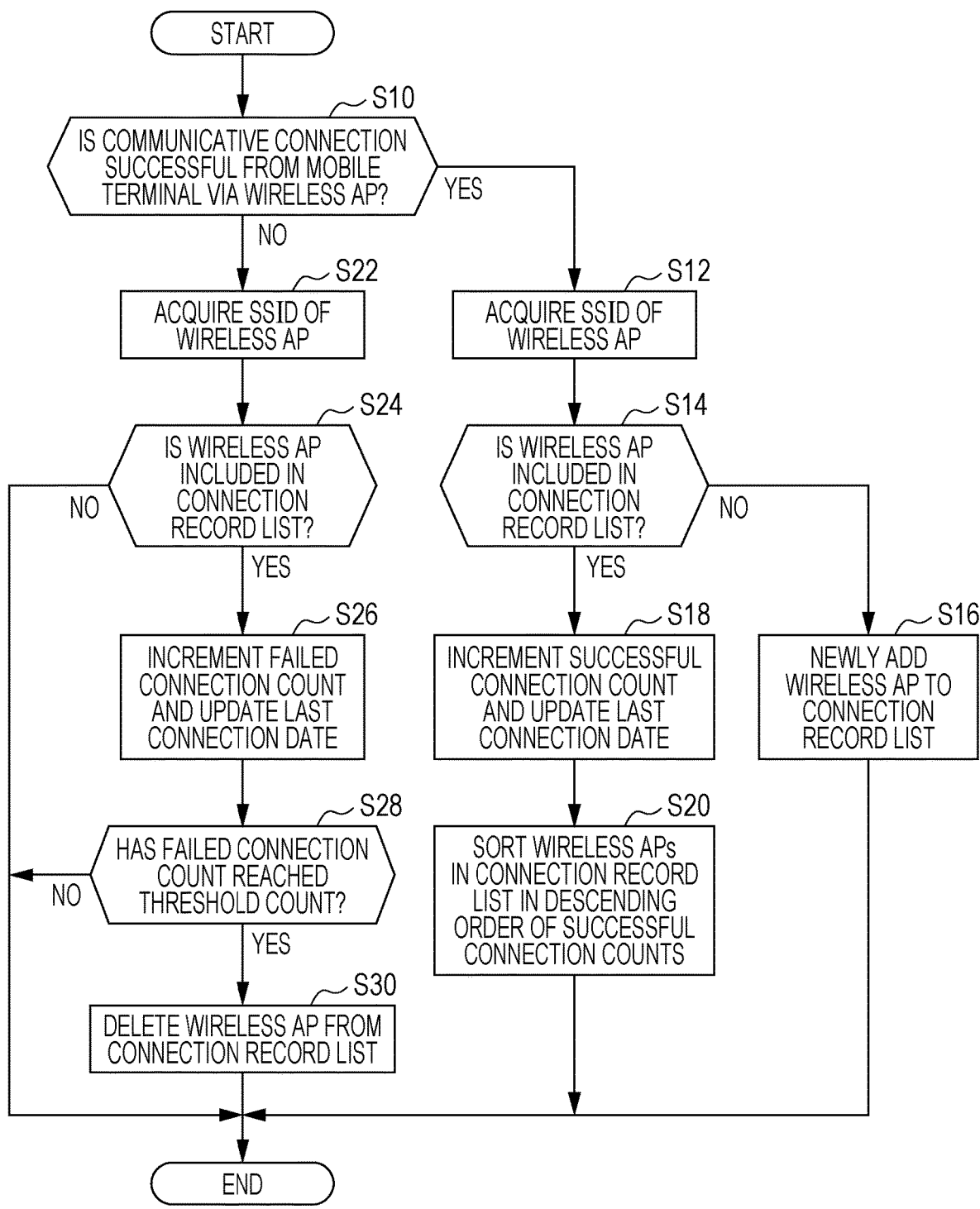
FIG. 6 is a flowchart illustrating a flow of an editing process for the connection record list.

The overview of the configuration of the information processing system 10 according to the first exemplary embodiment is as described above. A flow of a process to be executed by the information processing apparatus 12 according to the first exemplary embodiment is described below with reference to a flowchart of FIG. 6.

In Step S10, a mobile terminal 16 attempts to establish communicative connection to the information processing apparatus 12 via a wireless AP 14. The list processor 44 of the information processing apparatus 12 determines whether the communicative connection from the mobile terminal 16 to the information processing apparatus 12 via the wireless AP 14 is successful, that is, whether the information processing apparatus 12 undergoes the communicative connection from the mobile terminal 16 via the wireless AP 14. If the information processing apparatus 12 undergoes the communicative connection from the mobile terminal 16 via the wireless AP 14, the process proceeds to Step S12.

In Step S12, the list processor 44 acquires an SSID of the wireless AP 14. The list processor 44 receives authentication information of the wireless AP 14 from the mobile terminal 16.

In Step S14, the list processor 44 determines whether the connection record list 40 includes the SSID acquired in Step S12. If the connection record list 40 does not include the SSID, the process proceeds to Step S16. In Step S16, the list processor 44 newly adds, to the connection record list 40, connection information of the wireless AP 14 including the SSID and the authentication information acquired in Step S12, a successful connection count of "1", a failed connection count of "0", and a current time as the last connection date.

If determination is made in Step S14 that the connection record list 40 includes the SSID acquired in Step S12, the process proceeds to Step S18. In Step S18, the list processor 44 finds connection information of the wireless AP 14 in the connection record list 40 based on the SSID, and increments a successful connection count and updates the last connection date to a current time in the found connection information of the wireless AP 14.

In Step S20, the list processor 44 sorts the wireless APs 14 in the connection record list 40 in descending order of successful connection counts.

If the communicative connection from the mobile terminal 16 to the information processing apparatus 12 via the wireless AP 14 has failed in Step S10, the process proceeds to Step S22.

In Step S22, the user establishes short-range wireless communication between the mobile terminal 16 and the information processing apparatus 12, and the list processor 44 acquires the SSID of the wireless AP 14.

In Step S24, the list processor 44 determines whether the connection record list 40 includes the SSID acquired in Step S22. If the connection record list 40 does not include the SSID, the process is terminated. If the connection record list 40 includes the SSID, the process proceeds to Step S26.

In Step S26, the list processor 44 finds the connection information of the wireless AP 14 in the connection record list 40 based on the SSID, and increments a failed connection count and updates the last connection date to a current time in the found connection information of the wireless AP 14.

In Step S28, the list processor 44 determines whether the failed connection count incremented in Step S26 in the connection information of the wireless AP 14 has reached the threshold count. If the failed connection count has not reached the threshold count, the process is terminated. If the failed connection count has reached the threshold count, the process proceeds to Step S30.

In Step S30, the list processor 44 deletes the connection information of the wireless AP 14 from the connection record list 40.

Figure 7:
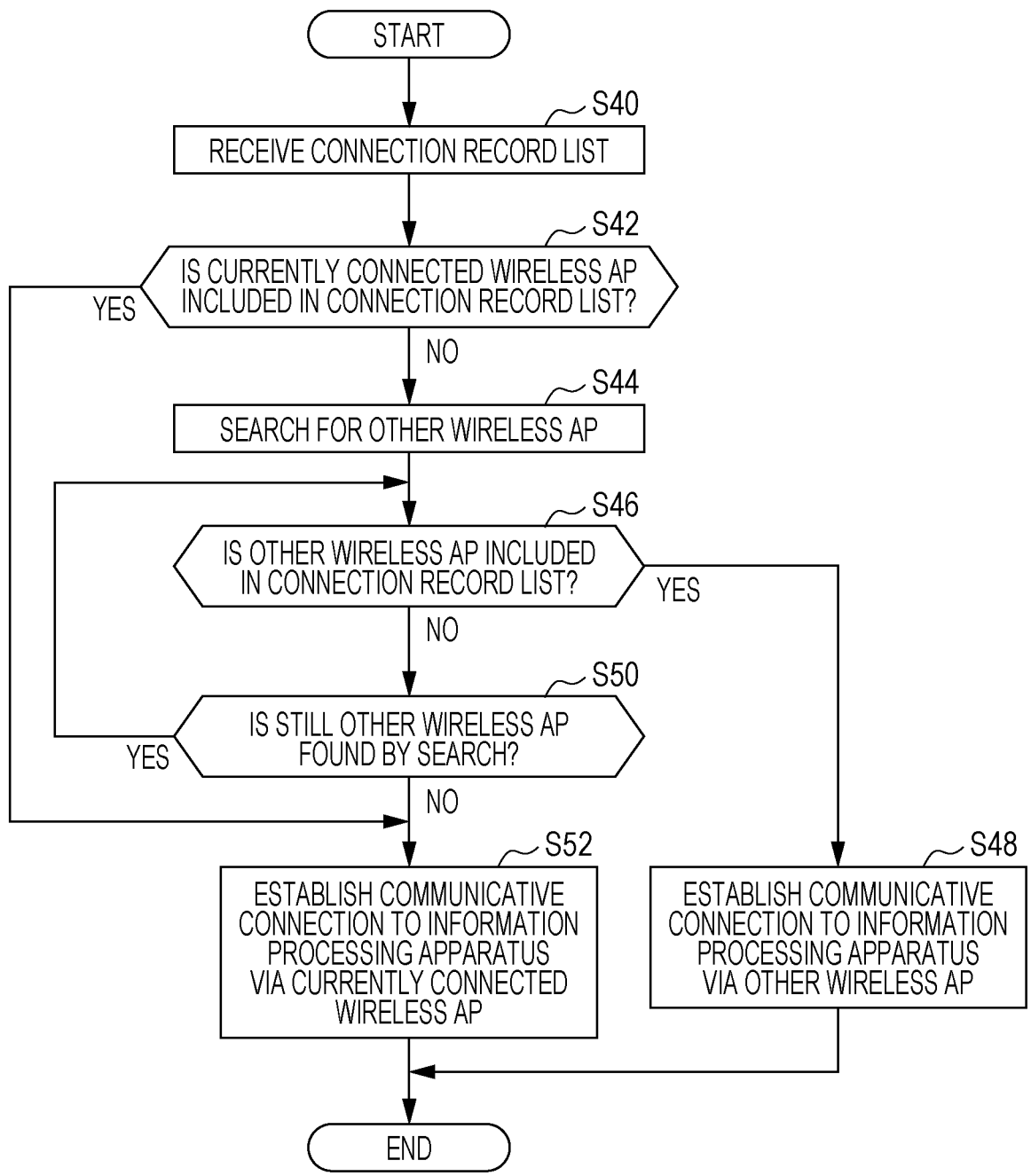
FIG. 7 is a flowchart illustrating a flow of a process to be executed by a mobile terminal in the first exemplary embodiment.

A flow of a process to be executed by the focused mobile terminal 16a according to the first exemplary embodiment is described below with reference to a flowchart of FIG. 7. At the start of the flowchart of FIG. 7, the focused mobile terminal 16a is communicatively connected to one wireless AP 14.

In Step S40, the user establishes short-range wireless communication between the focused mobile terminal 16a and the information processing apparatus 12, and the focused mobile terminal 16a receives the connection record list 40 from the information processing apparatus 12.

In Step S42, the searcher 66 of the focused mobile terminal 16a determines whether the connection record list 40 includes the currently connected wireless AP 14. If the connection record list 40 includes the currently connected wireless AP 14, the process proceeds to Step S52. If the connection record list 40 does not include the currently connected wireless AP 14, the process proceeds to Step S44.

In Step S44, the searcher 66 searches for another wireless AP 14 near the focused mobile terminal 16a.

In Step S46, the connection processor 62 determines whether the connection record list 40 includes the wireless AP 14 found in Step S44. If the connection record list 40 includes the wireless AP 14, the process proceeds to Step S48.

In Step S48, the connection processor 62 establishes communicative connection to the wireless AP 14 found in Step S44, and the focused mobile terminal 16a establishes communicative connection to the information processing apparatus 12 via the wireless AP 14.

If determination is made in Step S46 that the connection record list 40 does not include the wireless AP 14 found in Step S44, the process proceeds to Step S50.

In Step S50, the searcher 66 searches for another wireless AP 14 near the focused mobile terminal 16a again, and determines whether a wireless AP 14 other than the wireless AP 14 subjected to the process of Step S46 is found. If another wireless AP 14 is found, the process of Step S46 is repeated on the found wireless AP 14. If no other wireless AP 14 is found, in other words, if the wireless AP 14 in the connection record list 40 is not found near the focused mobile terminal 16a, the process proceeds to Step S52.

In Step S52, the connection processor 62 keeps the communicative connection to the currently connected wireless AP 14, and the focused mobile terminal 16a attempts to establish communicative connection to the information processing apparatus 12 via the currently connected wireless AP 14. After Step S52, the information processing apparatus 12 executes the process in the flowchart of FIG. 6.

Second Exemplary Embodiment

Figure 8:
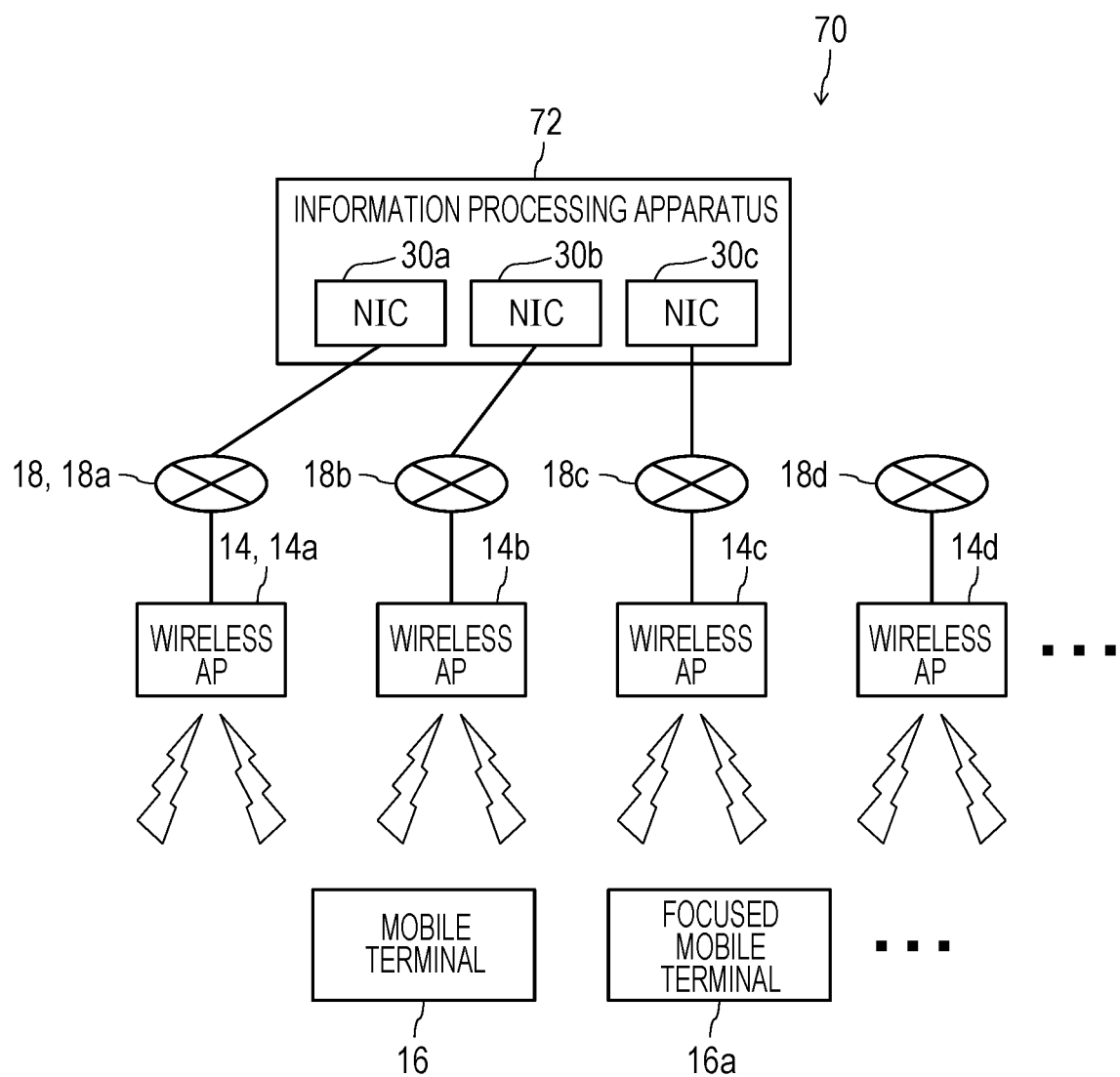
FIG. 8 is a schematic configuration diagram of an information processing system according to a second exemplary embodiment.

FIG. 8 is a schematic configuration diagram of an information processing system 70 according to a second exemplary embodiment. In the information processing system 70 according to the second exemplary embodiment, components similar to the components of the information processing system 10 according to the first exemplary embodiment are represented by the same reference symbols to omit description thereof. In the information processing system 70 according to the second exemplary embodiment, an information processing apparatus 72 includes a plurality of NICs 30, and the NICs 30 are connected to wireless APs 14 via different networks 18. That is, the plurality of NICs 30 communicate with the plurality of wireless APs 14 via the different networks 18, respectively.

The networks 18 connected to the NICs 30 differ from each other in terms of security levels. For example, the security level of the network 18b connected to an NIC 30b and the wireless AP 14b is higher than the security level of the network 18c connected to an NIC 30c and the wireless AP 14c, and the security level of the network 18a connected to an NIC 30a and the wireless AP 14a is higher than the security level of the network 18b. For example, the security levels are set depending on conditions for connection to the networks 18. For example, the network 18c having the lowest security level does not require authentication for connection, and anyone (any mobile terminal 16) is connectable to the network 18c. The network 18b having the security level higher than that of the network 18c requires authentication for connection, and preregistered users are connectable to the network 18b. The network 18a having the security level higher than that of the network 18b requires authentication for connection, and users in a specific department are connectable to the network 18a.

Because of the different security levels of the networks 18, details of a process executable by the information processing apparatus 72 vary in the information processing system 70 depending on a wireless AP 14 to which the mobile terminal 16 establishes communicative connection (i.e., a network 18 or NIC 30 to which the mobile terminal 16 establishes connection via the wireless AP 14). The details of the executable process are determined based on, for example, settings of the information processing apparatus 72. For example, the settings of the information processing apparatus 72 are determined by a manager of the information processing apparatus 72.

To cause the information processing apparatus 72 to execute a job, the user needs to establish communicative connection from the mobile terminal 16 to an NIC 30 via which the job is executable by the information processing apparatus 72. Examples of the job include a job in which the user directly operates the information processing apparatus 72 to scan a paper document and transfer scan data to his/her mobile terminal 16 via a wireless AP 14. In this case, the information processing apparatus 72 is not allowed to transmit the scan data via the network 18c having the low security level, but is allowed to transmit the scan data via the network 18a or 18b. At this time, the user causes his/her mobile terminal 16 to establish communicative connection to the information processing apparatus 72 via a wireless AP 14 to receive the scan data. If the mobile terminal 16 establishes communicative connection to the wireless AP 14c connected to the network 18c, the user fails to receive the scan data from the information processing apparatus 72. Therefore, the user needs to establish communicative connection from the mobile terminal 16 to the information processing apparatus 72 via an appropriate wireless AP 14 via which the job is executable by the information processing apparatus 72 (in the above example, the wireless AP 14a or 14b). The information processing system 70 assists the user in establishing communicative connection from the mobile terminal 16 to the information processing apparatus 72 via the appropriate wireless AP 14.

Figure 9:
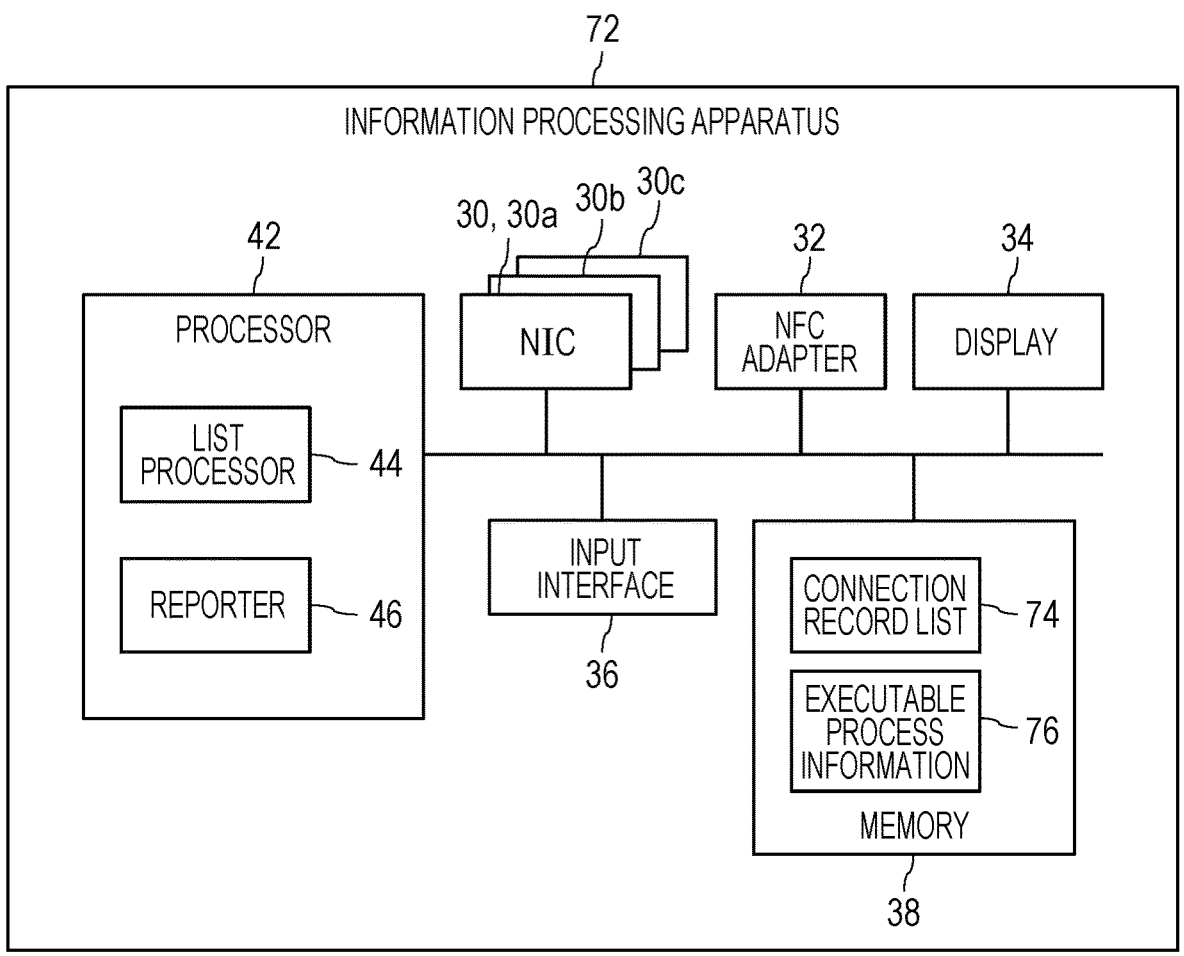
FIG. 9 is a schematic configuration diagram of an information processing apparatus according to the second exemplary embodiment.

FIG. 9 is a schematic configuration diagram of the information processing apparatus 72 according to the second exemplary embodiment. The information processing apparatus 72 according to the second exemplary embodiment differs from the information processing apparatus 12 according to the first exemplary embodiment in terms of the plurality of NICs 30, contents of a connection record list 74 stored in the memory 38, and executable process information 76 stored in the memory 38.

In the second exemplary embodiment, when the mobile terminal 16 establishes communicative connection to any one of the NICs 30 via any one of the wireless APs 14, the list processor 44 accumulates identification information of the wireless AP 14 via which the mobile terminal 16 establishes connection in the memory 38 for each NIC 30. The accumulated information serves as the connection record list 74. The connection record list 74 is a list in which the wireless APs 14 via which the mobile terminals 16 established communicative connection to the plurality of NICs 30 in the past are shown in association with the respective NICs 30.

FIG. 10 illustrates an example of the connection record list 74 in the second exemplary embodiment. For example, when the mobile terminal 16 establishes communicative connection to the NIC 30a via the wireless AP 14a, the list processor 44 registers connection information of the wireless AP 14a in the connection record list 74 in association with the NIC 30a. When the mobile terminal 16 establishes communicative connection to the NIC 30b via the wireless AP 14b, the list processor 44 registers connection information of the wireless AP 14b in the connection record list 74 in association with the NIC 30b. When the mobile terminal 16 establishes communicative connection to the NIC 30c via the wireless AP 14c, the list processor 44 registers connection information of the wireless AP 14c in the connection record list 74 in association with the NIC 30c.

The contents of the connection information of each wireless AP 14 may be similar to those in the first exemplary embodiment (see FIG. 4). Therefore, description thereof is omitted. In the first exemplary embodiment, the list processor 44 stores the connection information of the wireless AP 14 in the connection record list 40 when the mobile terminal 16 establishes communicative connection to the information processing apparatus 12 via the wireless AP 14. In the second exemplary embodiment, the list processor 44 may store the connection information of the wireless AP 14 in the connection record list 74 when the user establishes communicative connection from the mobile terminal 16 to the information processing apparatus 72 via the wireless AP 14 and the execution of a job input from the user is completed appropriately. The "successful connection count" in the connection information of the wireless AP 14 may be changed to a "successful job execution count" that is the number of times the execution of the job was completed appropriately, and the "failed connection count" in the connection information of the wireless AP 14 may be changed to a "failed job execution count" that is the number of times the execution of the job failed.

The executable process information 76 indicates, for each NIC 30, details of a process executable when the mobile terminal 16 establishes communicative connection to the wireless AP 14 associated with the NIC 30. FIG. 11 illustrates an example of contents of the executable process information 76.

In the example of FIG. 11, "Printing from mobile terminal", "Scan data transfer to mobile terminal", "Scan data transfer by mail", and "Scan data transfer by fax" are illustrated as the details of the processes. "Printing from mobile terminal" means that a print job is sent from the mobile terminal 16 to the NIC 30 via the wireless AP 14 and the information processing apparatus 72 executes the printing process based on the print job. "Scan data transfer to mobile terminal" means that the user directly operates the information processing apparatus 72 to execute the scanning process and transfer obtained scan data to the mobile terminal 16 that establishes communicative connection to the NIC 30 via the wireless AP 14. "Scan data transfer by mail" means that setting values related to a scan job are sent from the mobile terminal 16 to the NIC 30 via the wireless AP 14 and the user directly operates the information processing apparatus 72 to execute the scanning process and transfer obtained scan data by mail. "Scan data transfer by fax" means that setting values related to a scan job are sent from the mobile terminal 16 to the NIC 30 via the wireless AP 14 and the user directly operates the information processing apparatus 72 to execute the scanning process and transfer obtained scan data by fax. The details of the processes in the executable process information 76 are not limited to those described above. For example, the executable process information 76 may include a process in which a fax transfer job including an electronic document is sent from the mobile terminal 16 to the NIC 30 via the wireless AP 14 and the information processing apparatus 72 transfers the electronic document by fax based on the fax transfer job.

In the example of FIG. 11, "√" means "executable" and "–" means "inexecutable". For example, a combination of the NIC 30a and "Scan data transfer to mobile terminal" is assigned "√". This means that the scan data obtained by the scanning process is transferable to the mobile terminal 16 that establishes communicative connection to the NIC 30a via the wireless AP 14a. A combination of the NIC 30c and "Scan data transfer to mobile terminal" is assigned "–". This means that the scan data obtained by the scanning process is not transferable to the mobile terminal 16 that establishes communicative connection to the NIC 30c via the wireless AP 14c.

In the second exemplary embodiment, the reporter 46 reports the connection record list 74 for the individual NICs 30 and the executable process information 76 to a user who intends to establish communicative connection to the information processing apparatus 72 via the wireless AP 14 by using the mobile terminal 16.

As a method for reporting the connection record list 74 and the executable process information 76 to the user, similarly to the first exemplary embodiment, the connection record list 74 and the executable process information 76 may be transmitted to the focused mobile terminal 16a by short-range wireless communication, or may be displayed on the display 34 of the information processing apparatus 72.

First, the user refers to the executable process information 76 to find an NIC 30 to which the focused mobile terminal 16a may establish communicative connection so that a process related to a job to be sent from the user is executable by the information processing apparatus 72. For example, when the contents of the executable process information 76 are as illustrated in FIG. 11 and the user intends to cause the information processing apparatus 72 to execute a job for transferring scan data to the focused mobile terminal 16a, the user grasps that the focused mobile terminal 16a may establish communicative connection to the NIC 30a or 30b.

Then, the user refers to the connection record list 74 for the individual NICs 30 to find a wireless AP 14 that may establish communicative connection to the found NIC 30 (in the above example, the NIC 30a or 30b). Then, the user causes the focused mobile terminal 16a to establish communicative connection to the found wireless AP 14 and establish communicative connection via the wireless AP 14 to the NIC 30 via which the user's job is executable.

When the reporter 46 transmits the connection record list 74 for the individual NICs 30 and the executable process information 76 to the focused mobile terminal 16a by short-range wireless communication between the information processing apparatus 72 and the focused mobile terminal 16a, the connection processor 62 of the focused mobile terminal 16a may find an NIC 30 via which the process related to the user's job is executable based on the executable process information 76, establish communicative connection to a wireless AP 14 associated with the found NIC 30 in the connection record list 74 for the individual NICs 30, and establish communicative connection to the information processing apparatus 72 via the wireless AP 14. That is, when the focused mobile terminal 16a receives the connection record list 74 for the individual NICs 30 and the executable process information 76, the connection processor 62 may execute, in place of the user, the process of finding the NIC 30 and establishing communicative connection to the wireless AP 14 communicatively connectable to the found NIC 30.

Figure 12:
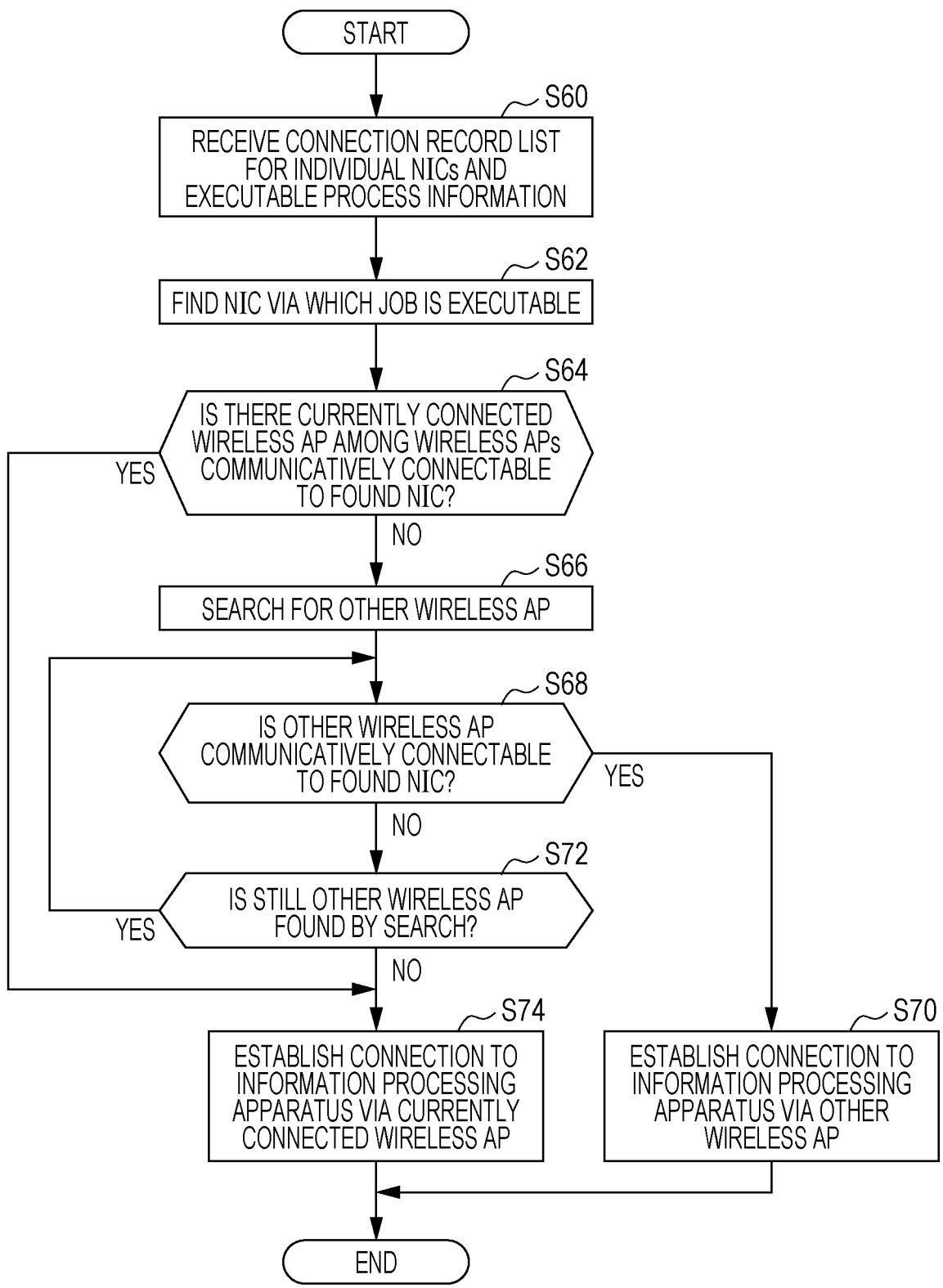
FIG. 12 is a flowchart illustrating a flow of a process to be executed by a mobile terminal in the second exemplary embodiment.

A flow of a process to be executed by the focused mobile terminal 16a according to the second exemplary embodiment is described below with reference to a flowchart of FIG. 12. At the start of the flowchart of FIG. 12, the focused mobile terminal 16a is communicatively connected to one wireless AP 14.

In Step S60, the user establishes short-range wireless communication between the focused mobile terminal 16a and the information processing apparatus 72, and the focused mobile terminal 16a receives the connection record list 74 for the individual NICs and the executable process information 76 from the information processing apparatus 72.

In Step S62, the connection processor 62 of the focused mobile terminal 16a finds an NIC 30 to which the focused mobile terminal 16a may establish communicative connection so that a job to be transmitted by the user is executable by the information processing apparatus 72 based on details of a process of the job and the executable process information 76 received in Step S60.

In Step S64, the searcher 66 of the focused mobile terminal 16a refers to the connection record list 74 for the individual NICs 30 received in Step S60 to determine whether communicative connection to the NIC 30 found in Step S62 may be established via a currently connected wireless AP 14. If the communicative connection is possible, the process proceeds to Step S74. If the communicative connection is impossible, the process proceeds to Step S66.

In Step S66, the searcher 66 searches for another wireless AP 14 near the focused mobile terminal 16a.

In Step S68, the connection processor 62 refers to the connection record list 74 for the individual NICs 30 to determine whether the communicative connection to the NIC 30 found in Step S62 may be established via the wireless AP 14 found in Step S66. If the communicative connection is possible, the process proceeds to Step S70.

In Step S70, the connection processor 62 establishes communicative connection to the wireless AP 14 found in Step S66, and the focused mobile terminal 16a establishes communicative connection to the NIC 30 found in Step S62 via the wireless AP 14. Then, the user causes the information processing apparatus 72 to execute the job.

If determination is made in Step S68 that the communicative connection to the NIC 30 found in Step S62 is impossible via the wireless AP 14 found in Step S66, the process proceeds to Step S72.

In Step S72, the searcher 66 searches for another wireless AP 14 near the focused mobile terminal 16a again, and determines whether a wireless AP 14 other than the wireless AP 14 subjected to the process of Step S68 is found. If another wireless AP 14 is found, the process of Step S68 is repeated on the found wireless AP 14. If no other wireless AP 14 is found, in other words, if the wireless AP 14 that may establish communicative connection to the NIC 30 found in Step S62 is not found near the focused mobile terminal 16a, the process proceeds to Step S74.

In Step S74, the connection processor 62 keeps the communicative connection to the currently connected wireless AP 14, and the focused mobile terminal 16a attempts to establish communicative connection to the information processing apparatus 72 via the currently connected wireless AP 14 to cause the information processing apparatus 72 to execute the process of the job.

Third Exemplary Embodiment

Figure 13:
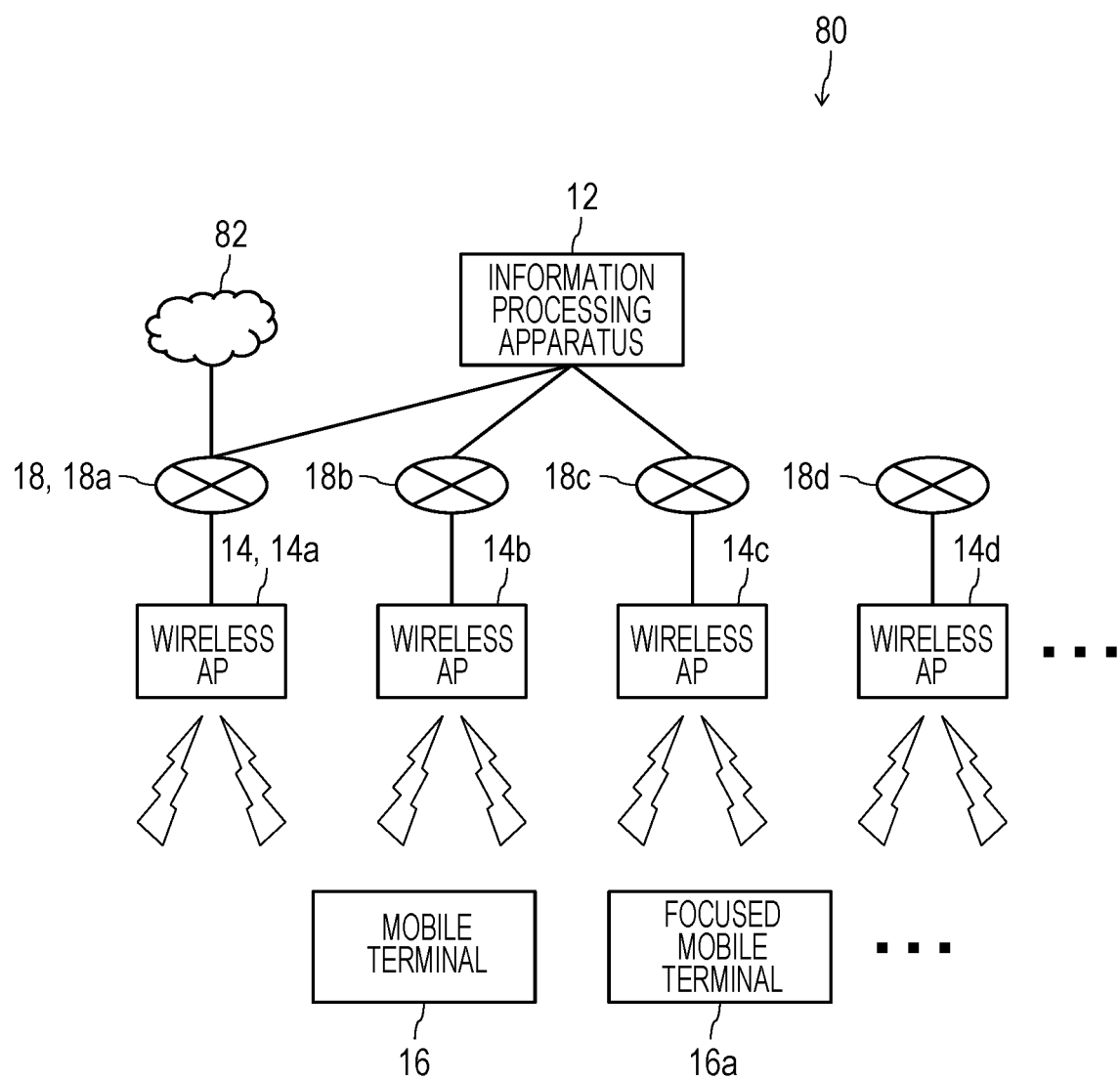
FIG. 13 is a schematic configuration diagram of an information processing system according to a third exemplary embodiment.

FIG. 13 is a schematic configuration diagram of an information processing system 80 according to a third exemplary embodiment. In the information processing system 80 according to the third exemplary embodiment, components similar to the components of the information processing system 10 according to the first exemplary embodiment are represented by the same reference symbols to omit description thereof. In the information processing system 80 according to the third exemplary embodiment, a part of the plurality of networks 18 connected to the information processing apparatus 12 is also connected to the Internet 82. In the example of FIG. 13, the network 18a is connected to the Internet 82. That is, when the mobile terminal 16 establishes communicative connection to the wireless AP 14a, the mobile terminal 16 may access the Internet 82 via the wireless AP 14a and the network 18a. The networks 18b and 18c are not connected to the Internet 82. Thus, the mobile terminal 16 is not able to access the Internet 82 even if the mobile terminal 16 establishes communicative connection to the wireless AP 14b or 14c.

As a job serving as the processing request to be transmitted from the mobile terminal 16 to the information processing apparatus 12, there is a job requiring the use of a service provided on the Internet 82. For example, if the job is a print job, a document conversion service provided as a cloud service on the Internet 82 may be used as a preprocess for a process related to the print job. Specifically, if an electronic document to be processed in the print job has a format that is not processable by the information processing apparatus 12 serving as the image forming apparatus, the print job may be transmitted to the information processing apparatus 12 after the electronic document is transmitted to the cloud service and its format is converted into a format processable by the information processing apparatus 12. To cause the information processing apparatus 12 to process the job appropriately, the mobile terminal 16 needs to establish communicative connection to a wireless AP 14 communicatively connectable to the information processing apparatus 12 and also connectable to the Internet 82. In the example of FIG. 13, the mobile terminal 16 needs to establish communicative connection to the wireless AP 14a instead of the wireless AP 14b or 14c. The information processing system 80 assists the user in establishing communicative connection from the mobile terminal 16 to the information processing apparatus 12 via the wireless AP 14 via which the job is executable by the information processing apparatus 12.

The third exemplary embodiment differs from the first exemplary embodiment in terms of the contents of the connection information of each wireless AP 14 in the connection record list 40. FIG. 14 illustrates an example of the contents of the connection information of the wireless AP 14 in the third exemplary embodiment. Comparison between FIG. 4 and FIG. 14 demonstrates that the connection information of the wireless AP 14 in the third exemplary embodiment includes attribute information.

The attribute information indicates an attribute related to the possibility of execution of a job to be transmitted from the mobile terminal 16 to the information processing apparatus 12 via the wireless AP 14. In this example, the possibility of execution of the job is determined based on whether the network 18 connected to the wireless AP 14 is connected to the Internet 82 as described above. Therefore, the attribute information indicates whether the network 18 connected to the wireless AP 14 is connectable to the Internet 82. That is, the attribute information indicates whether the mobile terminal 16 that establishes communicative connection to the wireless AP 14 is connectable to the Internet 82, and furthermore, whether the cloud service on the Internet 82 is available.

The attribute information is registered in the connection record list 40 by the list processor 44. Specifically, a job requiring the use of the cloud service on the Internet 82 is transmitted from the mobile terminal 16 to the information processing apparatus 12 via a wireless AP 14. If the execution of the job is successful, the mobile terminal 16 transmits an SSID of the wireless AP 14 and attribute information of the wireless AP 14 (in this example, information indicating that the connection to the Internet 82 is possible) to the information processing apparatus 12 by communication using the NIC 30 or short-range wireless communication using the NFC adapter 32. The list processor 44 registers the received SSID and the received attribute information in association with each other in the connection record list 40 as the connection information of the wireless AP 14.

In the first exemplary embodiment, the list processor 44 stores the connection information of the wireless AP 14 in the connection record list 40 when the mobile terminal 16 establishes communicative connection to the information processing apparatus 12 via the wireless AP 14. In the third exemplary embodiment, the list processor 44 may store the connection information of the wireless AP 14 in the connection record list 40 when the mobile terminal 16 transmits a job to the information processing apparatus 12 via the wireless AP 14 and the execution of the job is completed appropriately. The "successful connection count" in the connection information of the wireless AP 14 may be changed to a "successful job execution count" that is the number of times the execution of the job transmitted to the information processing apparatus 12 via the wireless AP 14 was completed appropriately, and the "failed connection count" in the connection information of the wireless AP 14 may be changed to a "failed job execution count" that is the number of times the execution of the job failed.

Also in the third exemplary embodiment, the reporter 46 reports the connection record list 40 including the attribute information of each wireless AP 14 to a user who intends to establish communicative connection to the information processing apparatus 12 via the wireless AP 14 by using the focused mobile terminal 16a.

Similarly to the first exemplary embodiment, the reporter 46 may transmit the connection record list 40 including the attribute information of each wireless AP 14 to the focused mobile terminal 16a by short-range wireless communication between the information processing apparatus 12 and the focused mobile terminal 16a. In this case, the connection processor 62 of the focused mobile terminal 16a may find a wireless AP 14 via which the user's job is executable based on details of the job and the attribute information of each wireless AP 14 in the connection record list 40, automatically establish communicative connection to the found wireless AP 14, and establish communicative connection to the information processing apparatus 12 via the wireless AP 14 to transmit the job. Specifically, the connection processor 62 determines an execution condition for the job to be transmitted by the user based on the details of the job. For example, the connection processor 62 identifies the format of an electronic document related to a user's print job. If the format is not processable by the information processing apparatus 12, the format of the electronic document needs to be converted by the cloud service prior to the process of the print job by the information processing apparatus 12. Therefore, the connection processor 62 determines a condition that the connection to the Internet is possible as the execution condition for the print job. The connection processor 62 refers to the attribute information of each wireless AP 14 in the connection record list 40 to find a wireless AP 14 that satisfies the determined execution condition for the job (i.e., a wireless AP 14 connectable to the Internet 82), and establishes communicative connection to the found wireless AP 14.

In the above example, the attribute information indicates whether the network 18 connected to the wireless AP 14 is connectable to the Internet 82. The attribute information is not limited thereto as long as the attribute information indicates an attribute related to the possibility of execution of a processing request to be transmitted from the mobile terminal 16 to the information processing apparatus 12 via the wireless AP 14. For example, in a case where a rasterization apparatus other than the information processing apparatus 12 rasterizes an electronic document related to a print job and transmits the rasterized data to the information processing apparatus 12, and the information processing apparatus 12 executes the printing process based on the received rasterized data, that is, in a case where the information processing apparatus 12 does not execute the rasterization process, the attribute information may indicate whether connection to the rasterization apparatus is possible.

Figure 15:
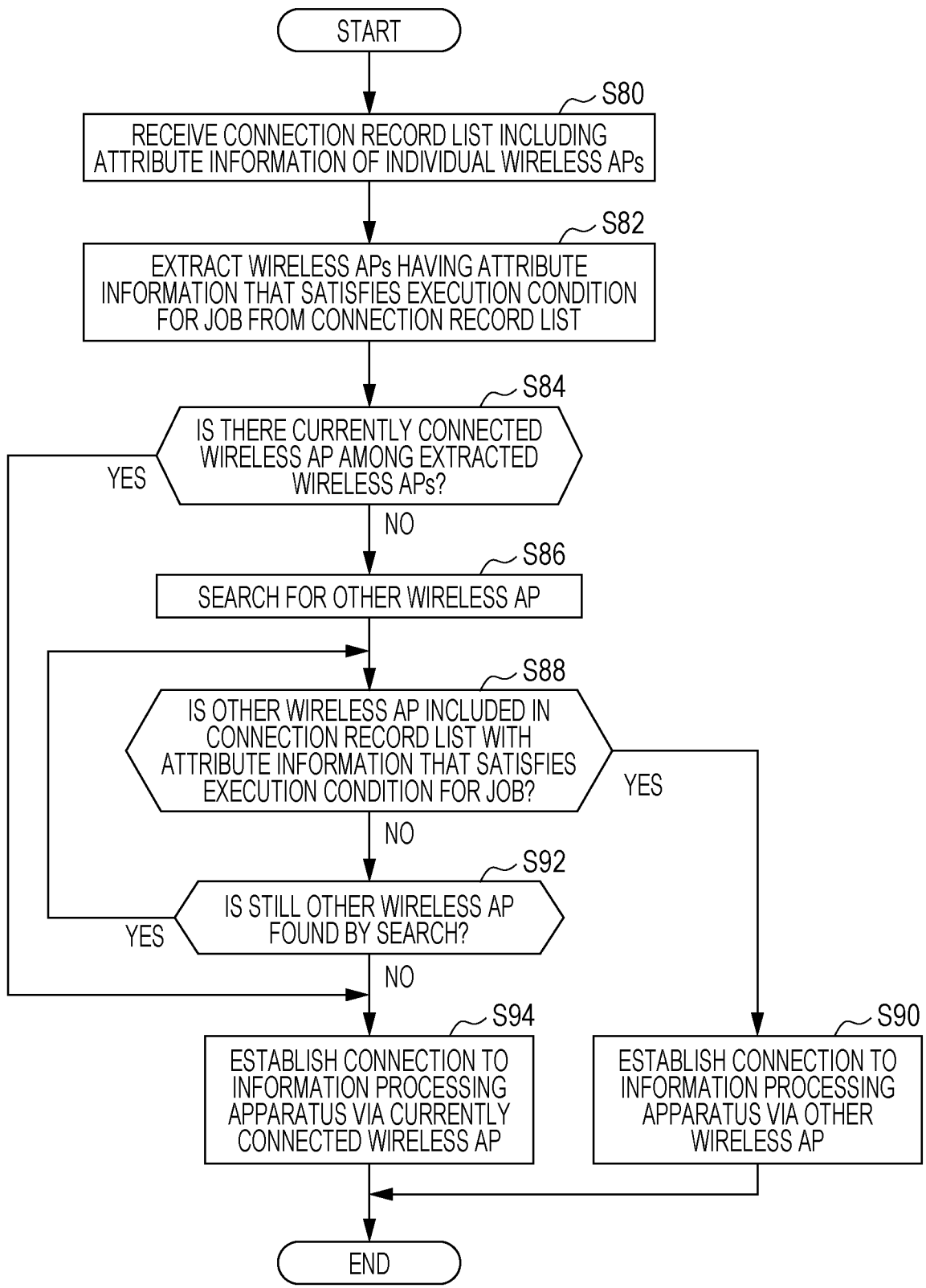
FIG. 15 is a flowchart illustrating a flow of a process to be executed by a mobile terminal in the third exemplary embodiment.

A flow of a process to be executed by the focused mobile terminal 16a according to the third exemplary embodiment is described below with reference to a flowchart of FIG. 15. At the start of the flowchart of FIG. 15, the focused mobile terminal 16a is communicatively connected to one wireless AP 14.

In Step S80, the user establishes short-range wireless communication between the focused mobile terminal 16a and the information processing apparatus 12, and the focused mobile terminal 16a receives the connection record list 40 including the attribute information of each wireless AP 14 from the information processing apparatus 12.

In Step S82, the connection processor 62 of the focused mobile terminal 16a determines an execution condition for a job to be transmitted by the user based on details of the job, and refers to the attribute information of each wireless AP 14 in the connection record list 40 to extract wireless APs 14 that satisfy the determined execution condition for the job.

In Step S84, the searcher 66 of the focused mobile terminal 16a determines whether the wireless APs 14 extracted in Step S82 include the currently connected wireless AP 14. If the currently connected wireless AP 14 is included, the process proceeds to Step S94. If the currently connected wireless AP 14 is not included, the process proceeds to Step S86.

In Step S86, the searcher 66 searches for another wireless AP 14 near the focused mobile terminal 16a.

In Step S88, the connection processor 62 determines whether the wireless AP 14 found in Step S86 is included in the connection record list 40 and satisfies the execution condition for the job determined in Step S82 by referring to the attribute information of the wireless AP 14. If the wireless AP 14 is included in the connection record list 40 and satisfies the execution condition for the job, the process proceeds to Step S90.

In Step S90, the connection processor 62 establishes communicative connection to the wireless AP 14 found in Step S86, and the focused mobile terminal 16a establishes communicative connection to the information processing apparatus 12 via the wireless AP 14 to transmit the job.

If determination is made in Step S88 that the wireless AP 14 found in Step S86 is not included in the connection record list 40 or does not satisfy the execution condition for the job, the process proceeds to Step S92.

In Step S92, the searcher 66 searches for another wireless AP 14 near the focused mobile terminal 16a again, and determines whether a wireless AP 14 other than the wireless AP 14 subjected to the process of Step S88 is found. If another wireless AP 14 is found, the process of Step S88 is repeated on the found wireless AP 14. If no other wireless AP 14 is found, in other words, if the wireless AP 14 that is included in the connection record list 40 and satisfies the execution condition for the job is not found near the focused mobile terminal 16a, the process proceeds to Step S94.

In Step S94, the connection processor 62 keeps the communicative connection to the currently connected wireless AP 14, and the focused mobile terminal 16a attempts to establish communicative connection to the information processing apparatus 12 via the currently connected wireless AP 14 to transmit the job and cause the information processing apparatus 12 to execute the process of the job.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing system comprising:
    a plurality of mobile terminals; and
    an information processing apparatus comprising an apparatus-side processor, wherein each of the mobile terminals is configured to establish communicative connection to the information processing apparatus via any one of a plurality of wireless access points,
    wherein the apparatus-side processor is configured to:
        accumulate, in a memory, pieces of identification information of the plurality of the wireless access points via which the mobile terminals established communicative connection to the information processing apparatus to generate a connection record list of the plurality of the wireless access points via which the mobile terminals established communicative connection to the information processing apparatus in a past; and
        transmit the connection record list of the plurality of the wireless access points to a target mobile terminal of a user who intends to establish communicative connection to the information processing apparatus, and
    wherein the plurality of the wireless access points are sorted in the list based on a number of prior successful connections from the respective wireless access point to the information processing apparatus.

2. The information processing system according to claim 1,
    wherein the apparatus-side processor is configured to transmit the connection record list to a focused mobile terminal that is the target mobile terminal of the user by short-range wireless communication with the focused mobile terminal, wherein the focused mobile terminal comprises a terminal-side processor, and wherein the terminal-side processor is configured to:
  if the received connection record list does not include a wireless access point currently communicatively connected to the focused mobile terminal, search for another wireless access point near the focused mobile terminal; and
  establish communicative connection to the information processing apparatus via the other wireless access point found by the search and included in the connection record list.

3. The information processing system according to claim 2, wherein the terminal-side processor is configured to, if none of the wireless access points in the connection record list is found by the search, attempt to establish communicative connection to the information processing apparatus via the wireless access point currently communicatively connected to the focused mobile terminal.

4. The information processing system according to claim 3, wherein the apparatus-side processor is configured to:
  acquire pieces of authentication information used by the mobile terminals to establish communicative connection to the wireless access points via which the mobile terminals established communicative connection to the information processing apparatus;
  store the pieces of authentication information in association with the individual wireless access points in the connection record list; and
  transmit the connection record list including the pieces of authentication information to the target mobile terminal of the user.

5. The information processing system according to claim 2, wherein the apparatus-side processor is configured to:
  acquire pieces of authentication information used by the mobile terminals to establish communicative connection to the wireless access points via which the mobile terminals established communicative connection to the information processing apparatus;
  store the pieces of authentication information in association with the individual wireless access points in the connection record list; and
  transmit the connection record list including the pieces of authentication information to the target mobile terminal of the user.

6. The information processing system according to claim 1, wherein the apparatus-side processor is configured to:
  acquire pieces of authentication information used by the mobile terminals to establish communicative connection to the wireless access points via which the mobile terminals established communicative connection to the information processing apparatus;
  store the pieces of authentication information in association with the individual wireless access points in the connection record list; and
  transmit the connection record list including the pieces of authentication information to the target mobile terminal of the user.

7. The information processing system according to claim 1, wherein the apparatus-side processor is configured to:
  compile, for the individual wireless access points, successful connection counts that are the numbers of times the mobile terminals established communicative connection to the information processing apparatus via the wireless access points; and
  transmit the successful connection counts of the wireless access points to the target mobile terminal of the user.

8. The information processing system according to claim 7, wherein the apparatus-side processor is configured to:
  compile, for the individual wireless access points in the connection record list, failed connection counts that are the numbers of times the mobile terminals attempted to establish communicative connection to the information processing apparatus via the wireless access points but failed to establish the communicative connection; and
  delete, from the connection record list, the wireless access point in which the failed connection count has reached a threshold count.

9. The information processing system according to claim 8, wherein the apparatus-side processor is configured to delete, from the connection record list, the wireless access point that is not used for communicative connection between each of the mobile terminals and the information processing apparatus for a predetermined period among the wireless access points in the connection record list.

10. The information processing system according to claim 7, wherein the apparatus-side processor is configured to delete, from the connection record list, the wireless access point that is not used for communicative connection between each of the mobile terminals and the information processing apparatus for a predetermined period among the wireless access points in the connection record list.

11. The information processing system according to claim 1, wherein the apparatus-side processor is configured to:
  compile, for the individual wireless access points in the connection record list, failed connection counts that are the numbers of times the mobile terminals attempted to establish communicative connection to the information processing apparatus via the wireless access points but failed to establish the communicative connection; and
  delete, from the connection record list, the wireless access point in which the failed connection count has reached a threshold count.

12. The information processing system according to claim 11, wherein the apparatus-side processor is configured to delete, from the connection record list, the wireless access point that is not used for communicative connection between each of the mobile terminals and the information processing apparatus for a predetermined period among the wireless access points in the connection record list.

13. The information processing system according to claim 1, wherein the apparatus-side processor is configured to delete, from the connection record list, the wireless access point that is not used for communicative connection between each of the mobile terminals and the information processing apparatus for a predetermined period among the wireless access points in the connection record list.

14. The information processing system according to claim 1,
  wherein the information processing apparatus comprises a plurality of communication interfaces configured to communicate with the wireless access points via different networks, respectively, and
  wherein the apparatus-side processor is configured to:
    generate the connection record list for the individual communication interfaces so that the wireless access points via which the mobile terminals established communicative connection to the communication interfaces in the past are listed in association with the individual communication interfaces; and transmit the connection record list for the individual communication interfaces and executable process information to the target mobile terminal of the user, the executable process information indicating, for the individual communication interfaces, details of processes executable when the mobile terminals establish communicative connection to the wireless access points associated with the communication interfaces.

15. The information processing system according to claim 14,
wherein the apparatus-side processor is configured to transmit the connection record list for the individual communication interfaces and the executable process information to a focused mobile terminal that is the target mobile terminal of the user by short-range wireless communication with the focused mobile terminal,
wherein the focused mobile terminal comprises a terminal-side processor, and
wherein the terminal-side processor is configured to:
find, based on the executable process information, the communication interface via which a process related to a processing request from the user is executable;
establish communicative connection to the wireless access point associated with the found communication interface in the connection record list for the individual communication interfaces; and
establish communicative connection to the information processing apparatus via the wireless access point.

16. The information processing system according to claim 1, wherein the apparatus-side processor is configured to:
acquire pieces of attribute information indicating attributes of the wireless access points via which the mobile terminals established communicative connection to the information processing apparatus in the past, the attributes being related to possibilities of execution of processing requests to be transmitted from the mobile terminals to the information processing apparatus via the wireless access points;
store the pieces of attribute information in association with the individual wireless access points in the connection record list; and
transmit the connection record list including the pieces of attribute information to the target mobile terminal of the user.

17. The information processing system according to claim 16,
wherein the apparatus-side processor is configured to transmit the connection record list including the pieces of attribute information to a focused mobile terminal that is the target mobile terminal of the user by short-range wireless communication with the focused mobile terminal,
wherein the focused mobile terminal comprises a terminal-side processor, and
wherein the terminal-side processor is configured to:
find the wireless access point via which a processing request from the user is executable based on details of the processing request and the pieces of attribute information of the wireless access points in the connection record list; and
establish communicative connection to the information processing apparatus via the found wireless access point.

18. An information processing apparatus comprising an apparatus-side processor configured to:
accumulate, in a memory, pieces of identification information of a plurality of wireless access points via which mobile terminals established communicative connection to the information processing apparatus to generate a connection record list of the plurality of the wireless access points via which the mobile terminals established communicative connection to the information processing apparatus in a past; and
transmit the connection record list of the plurality of the wireless access points to a target mobile terminal of a user who intends to establish communicative connection to the information processing apparatus,
wherein the plurality of the wireless access points are sorted in the list based on a number of prior successful connections from the respective wireless access point to the information processing apparatus.

19. A non-transitory computer readable medium storing a program causing a computer to execute a process comprising:
accumulating, in a memory, pieces of identification information of a plurality of wireless access points via which mobile terminals established communicative connection to an apparatus including the computer to generate a connection record list of the plurality of the wireless access points via which the mobile terminals established communicative connection to the apparatus in a past; and
transmitting the connection record list of the plurality of the wireless access points to a target mobile terminal of a user who intends to establish communicative connection to the apparatus,
wherein the plurality of the wireless access points are sorted in the list based on a number of prior successful connections from the respective wireless access point to the computer.

* * * * *